O. N. GARR.
RATCHET DEVICE.
APPLICATION FILED FEB. 26, 1913.
1,098,434.
Patented June 2, 1914.
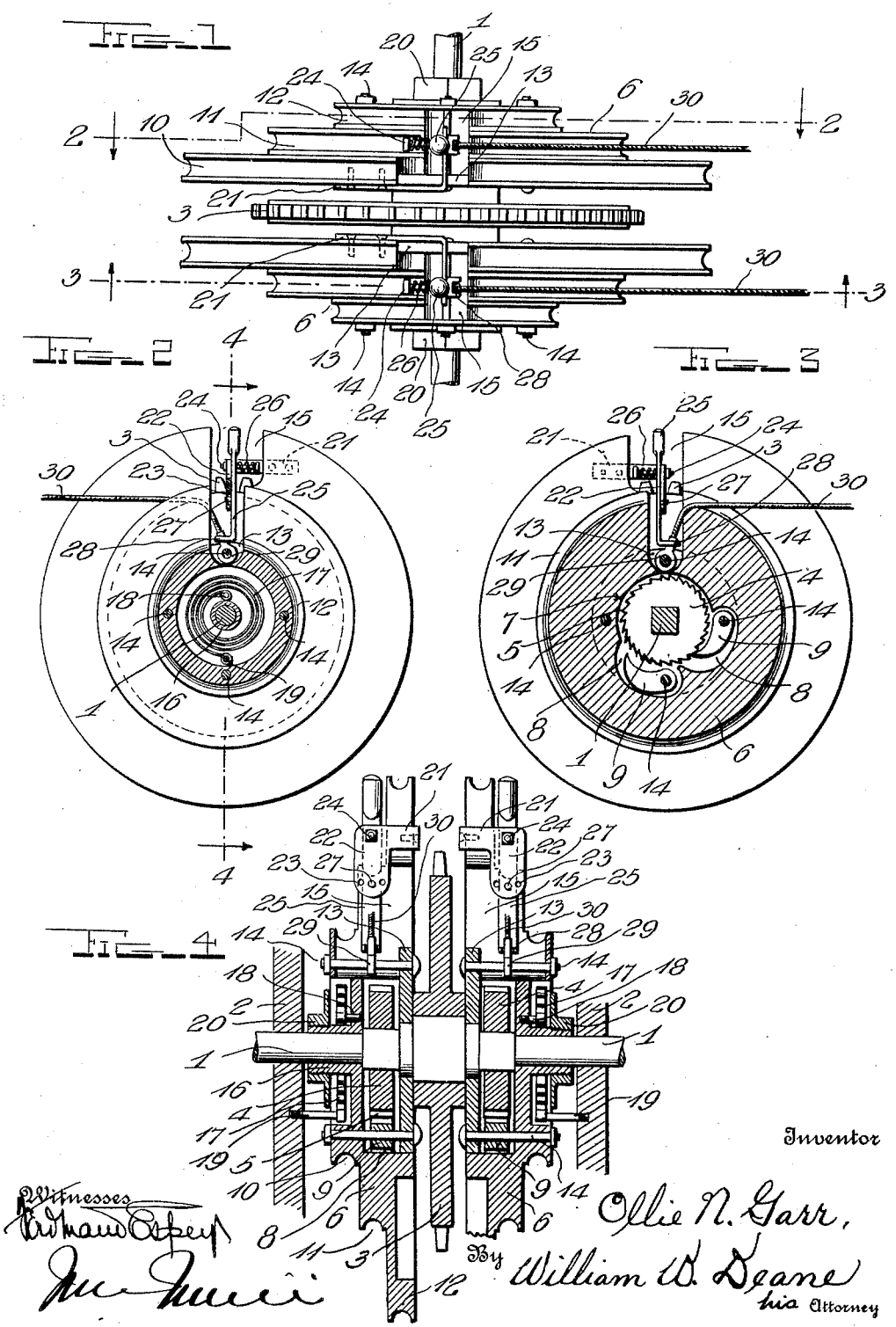

UNITED STATES PATENT OFFICE.

OLLIE N. GARR, OF LEXINGTON, KENTUCKY.

RATCHET DEVICE.

1,098,434. Specification of Letters Patent. Patented June 2, 1914.

Application filed February 26, 1913. Serial No. 750,843.

*To all whom it may concern:*

Be it known that I, OLLIE N. GARR, a citizen of the United States, residing at Lexington, in the county of Fayette and State of Kentucky, have invented certain new and useful Improvements in Ratchet Devices, of which the following is a specification.

This invention relates to ratchet devices especially adapted to be used by bicycles, tricycles, invalid chairs or other perambulators; and it consists in the novel features hereinafter described and particularly pointed out in the claims.

An object of the invention is to provide in a device of the character indicated a series of pulleys of different diameters together with a cord or cable arranged to wind upon and unwind from the said pulleys. Means is provided for shifting the cable so that it may wind upon any particular pulley and thus when the cable or cord winds upon the pulley of least diameter a greater pulling force must be exerted to rotate the pulleys at a given rate of speed than when the cable or cord is arranged to wind upon the pulley of greatest diameter. Such a device is advantageous when used upon carriages or chairs as above stated for the reason that when the perambulator is being propelled up an incline the cable may be shifted to reduce the force necessary to cause the chair or perambulator to ascend the incline.

With these and other objects in view, the invention consists in certain novel features of construction as hereinafter shown and described, and then particularly pointed out in the claims and in the drawings illustrative of the preferred embodiment of the invention.

In the accompanying drawing: Figure 1 is a top plan view of the ratchet device. Fig. 2 is a vertical sectional view of the same cut on the line 2—2 of Fig. 1. Fig. 3 is a similar view cut on the line 3—3 of Fig. 1. Fig. 4 is a transverse sectional view of the same cut on the line 4—4 of Fig. 2.

Corresponding and like parts are referred to in the following description and indicated in all the views of the accompanying drawings by the same reference characters.

The device comprises a shaft 1 which may be suitably journaled in bearings 2 which are located upon or constitute part of the frame of the bicycle, tricycle, perambulator, etc. (Not shown).

A sprocket wheel 3 is fixed to the shaft 2 and a chain (not shown) is adapted to be passed around the wheel 3 and a suitable wheel upon the axle of the perambulator. (Not shown.) Ratchet devices are located at the opposite sides of the wheel 3 and inasmuch as these devices are of the same pattern and structural arrangement description of one will answer for both. Each ratchet device comprises a ratchet wheel 4 having at its periphery teeth 5. The wheel 4 is fixed to the shaft 1. A disk 6 is journaled upon the shaft 1 and is provided with a compartment 7 which receives the ratchet wheel 4. At the opposite sides of the compartment 7, the disk 6 is provided with recesses 8 in which are pivoted pawls 9 which are adapted to engage the teeth 5 of the ratchet wheel 4. Each disk 6 is provided at its periphery with annular grooves which constitute distinct pulleys. The number of grooves and pulleys in the present instance being three, although this number may be increased or diminished as desired. The innermost groove 10 represents that of the pulley of the greatest diameter. The intermediate groove 11 that of the next largest pulley and the outer groove 12 that of the smallest pulley. The inner end of the compartment 7 is closed by a plate 13 which is held in position in the disk 7 by means of bolts 14 which pass transversely through the disk 6. Two of these bolts serve as pivots for the pawls 9 and a third of these bolts passes through the bottom of a slot 15 which extends inwardly in a radial direction from the periphery of the disk 6. The disk 6 is provided at its outer side with a hub 16 and a spiral spring 17 surrounds the said hub, one end of the said spring is attached to a pin 18 which is fixed to the disk 6 and the other end of the said spring is attached to a pin 19, which is fixed to the bearing 2. A nut 20 is screw-threaded upon the outer end of the hub 16 and serves as means for holding the spring 17 against edgewise movement in an outward direction along the said hub 16.

An arm 21 is fixed to the disk 6 and extends partially across the slot 15 at the inner edge thereof. This arm is provided with a downwardly disposed lug 22 which is located in the upper or outer portion of the slot 15. The lower part of the lug 22 is provided with several openings or indentations 23. A pin 24 is secured at one end in the arm 21 and a spring 26 surrounds the said pin and bears at one end against the side of the lever 25 and at its other end against the wall of the head of the pin. The said spring 26 is under tension with a tendency to force or hold the lever 25 toward the lug 22 of the arm 21. The lever 25 is provided at its side with a nib 27 which is adapted to enter in one of the openings 23 in the lug 22. The lever 25 is provided at its inner end with an angularly disposed fork 28. An eye 29 is slidably mounted upon that bolt 14 which passes transversely through the inner portion of the slot 15, and a cord or cable 30 is connected to the said eye. Levers (not shown) are adapted to be connected with the forward ends of the cables 30 and may be swung back and forth in the usual manner to draw the cables 30 in a forward direction or to permit them to move rearwardly when they are winding upon the pulleys of the disks 6.

It will readily be understood that when the disks 6 are rotated in one direction the pawls 9 engage the teeth 5 of the ratchet wheels 4, and the shaft 1 is rotated in unison with the said disks. When however, the disks are rotated in an opposite direction under the influence of the spring 17 the pawls 9 ride over the teeth 5 of the wheels 4 and the shaft 1 may continue to rotate in the first mentioned direction.

If for any reason it is desired to shift the cable 30 to any particular groove of the set of grooves 10, 11, or 12 it is necessary only to press the lever 25 back against the spring 26 which is thereby compressed and the nib 27 is removed from one of the openings 23. The lever 25 is then swung so that the eye 29, a portion of which is received between the branches of the fork 28 is moved along the bolt 14 and the cable 30 is moved opposite the particular groove in which it is to operate. Therefore the cable may be positioned to operate in a pulley of greatest, intermediate or least diameter as desired. When the cable is inserted in the desired groove pressure is removed from the lever 29 and the spring 26 moves the said lever toward the lug 22 so that the nib 27 enters one of the openings 23 and the parts are secured in their adjusted positions.

Having described the invention what is claimed, is:—

1. In a device as described, a differential pulley, a cable connected to the pulley to wind upon the same and shiftable with relation to the different diameters of the pulley and means carried by the pulley for shifting the cable.

2. In a device as described, a differential pulley provided with a slot, a cable entering the slot and connected with the pulley and means located in the slot for shifting the cable.

3. In a device as described, a differential pulley provided with a slot, a bolt passing through the slot, a cable slidably connected with the bolt, and a lever fulcrumed upon the pulley and engaging the cable and adapted to move the cable.

4. In a device as described, a differential pulley provided with a slot, an arm carried by the pulley and having a portion located in the slot, a lever fulcrumed upon the arm, means for fixing the lever in an adjusted position with relation to the arm and a cable slidably secured in the slot and engaged by said lever.

5. In a device as described, a differential pulley provided with a slot, an arm carried by the pulley and extending into the slot, said arm having openings, a spring pressed lever carried by the pulley, a nib carried by the lever and adjusted to enter the openings and a cable slidably secured to the pulley in the slot, said lever engaging the cable.

6. In a device as described, a differential pulley provided with a slot, a bolt extending transversely across the inner end of the slot, an arm carried by the pulley and extending into the slot and having openings, a spring pressed lever fulcrumed to the arm and having a nib adapted to enter the openings of the arm, said lever having a forked end, an eye slidably mounted upon the bolt and a cable connected to the eye and passing through the branches of the forked end of the lever.

In testimony whereof I affix my signature in presence of two witnesses.

OLLIE N. GARR.

Witnesses:
  GEO. ROBERTSON,
  H. L. THOMPSON.

---

Copies of this patent may be obtained for five cents each, by addressing the "Commissioner of Patents, Washington, D. C."